(12) United States Patent
Cooper et al.

(10) Patent No.: US 9,933,054 B2
(45) Date of Patent: Apr. 3, 2018

(54) CONTINUOUSLY VARIABLE TRANSMISSION AND AN INFINITELY VARIABLE TRANSMISSION VARIATOR DRIVE

(71) Applicant: Dana Limited, Maumee, OH (US)

(72) Inventors: Kenneth E. Cooper, Toledo, OH (US); Mark R. J. Versteyhe, Oostkamp (BE); James F. Ziech, Kalamazoo, MI (US)

(73) Assignee: Dana Limited, Maumee, OH (US)

( * ) Notice: Subject to any disclaimer, the term of this patent is extended or adjusted under 35 U.S.C. 154(b) by 0 days.

(21) Appl. No.: 15/380,043

(22) Filed: Dec. 15, 2016

(65) Prior Publication Data

US 2017/0097069 A1  Apr. 6, 2017

Related U.S. Application Data

(63) Continuation of application No. 14/769,296, filed on Aug. 20, 2015, now Pat. No. 9,551,404.

(60) Provisional application No. 61/785,793, filed on Mar. 14, 2013.

(51) Int. Cl.
*F16H 15/52* (2006.01)
*F16H 37/08* (2006.01)

(52) U.S. Cl.
CPC .......... *F16H 15/52* (2013.01); *F16H 37/086* (2013.01); *F16H 2037/0866* (2013.01); *F16H 2200/2005* (2013.01); *F16H 2200/2035* (2013.01)

(58) Field of Classification Search
None
See application file for complete search history.

(56) References Cited

U.S. PATENT DOCUMENTS

| | | | |
|---|---|---|---|
| 1,063,244 A | 6/1913 | Dieterich |
| 1,215,969 A | 2/1917 | Murray |
| 1,526,140 A | 2/1925 | Gruver |
| 2,019,006 A | 10/1935 | Ferrari |
| 2,060,884 A | 11/1936 | Madle |
| 2,148,759 A | 2/1939 | Grand |

(Continued)

FOREIGN PATENT DOCUMENTS

| | | |
|---|---|---|
| AU | 2011224083 A1 | 10/2011 |
| CN | 101479503 A | 7/2009 |

(Continued)

OTHER PUBLICATIONS

Fallbrook Technologies Inc. NuVinci® Technology, Feb. 26, 2013; [Retrieved from internet on Jun. 5, 2014].: URL: https://web.archive.org/web/20130226233109/http://www.fallbrooktech.com/nuvinci-technology.

(Continued)

*Primary Examiner* — Dirk Wright
(74) *Attorney, Agent, or Firm* — Marshall & Melhorn, LLC

(57) ABSTRACT

A transmission having a variator drive capable of being placed in a continuously variable operating mode or an infinitely variable operating mode, capable of having a wide ratio range, and capable of integrating a clutching capability within the transmission. The variable transmissions can be operated in at least two different operating modes, depending on an engagement status of the clutches therein. Methods of running the variable transmissions and drivelines that incorporate such variable transmissions are provided.

20 Claims, 4 Drawing Sheets

(56) References Cited

U.S. PATENT DOCUMENTS

| | | |
|---|---|---|
| 2,405,201 A | 8/1946 | Franck |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,376,633 A | 4/1968 | Wesley |
| 3,407,687 A | 10/1968 | Hayashi |
| 3,470,720 A | 10/1969 | Eklund et al. |
| 3,505,718 A | 4/1970 | Carlstrom |
| 3,583,060 A | 6/1971 | Sigmans |
| 3,688,600 A | 9/1972 | Leonard |
| 3,765,270 A | 10/1973 | Lemieux |
| 3,774,280 A | 11/1973 | Eklund et al. |
| 3,831,245 A | 8/1974 | Amos |
| 3,894,559 A | 7/1975 | DePuy |
| 4,046,988 A | 9/1977 | Okuda et al. |
| 4,056,988 A | 11/1977 | Kubo et al. |
| 4,187,709 A | 2/1980 | Legate et al. |
| 4,226,140 A | 10/1980 | Gaasenbeek |
| 4,333,358 A | 6/1982 | Grattapaglia |
| 4,344,336 A | 8/1982 | Carriere |
| 4,368,572 A | 1/1983 | Kanazawa et al. |
| 4,464,952 A | 8/1984 | Stubbs |
| 4,693,134 A | 9/1987 | Kraus |
| 4,731,044 A | 3/1988 | Mott |
| 4,756,211 A | 7/1988 | Fellows |
| 4,784,017 A | 11/1988 | Johnshoy |
| 4,856,371 A | 8/1989 | Kemper |
| 4,856,374 A | 8/1989 | Kreuzer |
| 4,950,208 A | 8/1990 | Tomlinson |
| 4,963,122 A | 10/1990 | Ryan |
| 4,963,124 A | 10/1990 | Takahashi et al. |
| 5,109,962 A | 5/1992 | Sato |
| 5,217,412 A | 6/1993 | Indlekofer et al. |
| 5,230,670 A | 7/1993 | Hibi |
| 5,238,460 A | 8/1993 | Esaki et al. |
| 5,318,486 A | 6/1994 | Lutz |
| 5,390,759 A | 2/1995 | Gollner |
| 5,401,221 A | 3/1995 | Fellows et al. |
| 5,520,588 A | 5/1996 | Hall, III |
| 5,527,231 A | 6/1996 | Seidel et al. |
| 5,577,423 A | 11/1996 | Mimura |
| 5,599,251 A | 2/1997 | Beim et al. |
| 5,659,956 A | 8/1997 | Braginsky et al. |
| 5,683,322 A | 11/1997 | Meyerle |
| 5,726,353 A | 3/1998 | Matsuda et al. |
| 5,730,678 A | 3/1998 | Larkin |
| 5,766,105 A | 6/1998 | Fellows et al. |
| 5,776,028 A | 7/1998 | Matsuda et al. |
| 5,800,303 A | 9/1998 | Benford |
| 5,860,888 A | 1/1999 | Lee |
| 5,915,801 A | 6/1999 | Taga et al. |
| 5,961,415 A | 10/1999 | Justice et al. |
| 5,971,883 A | 10/1999 | Klemen |
| 5,996,226 A | 12/1999 | Gibbs |
| 6,009,365 A | 12/1999 | Takahara et al. |
| 6,036,616 A | 3/2000 | McCarrick et al. |
| 6,045,477 A | 4/2000 | Schmidt |
| 6,053,839 A | 4/2000 | Baldwin et al. |
| 6,059,685 A | 5/2000 | Hoge et al. |
| 6,071,208 A | 6/2000 | Koivunen |
| 6,080,080 A | 6/2000 | Bolz et al. |
| 6,083,135 A | 7/2000 | Baldwin et al. |
| 6,086,504 A | 7/2000 | Illerhaus |
| 6,089,287 A | 7/2000 | Welsh et al. |
| 6,095,942 A | 8/2000 | Yamaguchi et al. |
| 6,155,951 A | 12/2000 | Kuhn et al. |
| 6,217,474 B1 | 4/2001 | Ross et al. |
| 6,251,038 B1 | 6/2001 | Ishikawa et al. |
| 6,273,838 B1 | 8/2001 | Park |
| 6,342,026 B1 | 1/2002 | Takagi et al. |
| 6,358,178 B1 | 3/2002 | Wittkopp |
| 6,371,880 B1 | 4/2002 | Kam |
| 6,405,117 B1 | 6/2002 | Walenty et al. |
| 6,481,258 B1 | 11/2002 | Belinky |
| 6,554,735 B2 | 4/2003 | Kanazawa |
| 6,558,285 B1 | 5/2003 | Sieber |
| 6,585,619 B2 | 7/2003 | Henzler |
| 6,609,994 B2 | 8/2003 | Muramoto |
| 6,632,157 B1 | 10/2003 | Gierling et al. |
| 6,641,497 B2 | 11/2003 | Deschamps et al. |
| 6,645,106 B2 | 11/2003 | Goo |
| 6,689,012 B2 | 2/2004 | Miller et al. |
| 6,705,964 B2 | 3/2004 | Nagai et al. |
| 6,719,659 B2 | 4/2004 | Geiberger et al. |
| 6,723,016 B2 | 4/2004 | Sumi |
| 6,726,590 B2 | 4/2004 | Henzler et al. |
| 6,733,412 B2 | 5/2004 | Kumagai et al. |
| 6,752,696 B2 | 6/2004 | Murai et al. |
| 6,793,603 B2 | 9/2004 | Teraoka et al. |
| 6,849,020 B2 | 2/2005 | Sumi |
| 6,866,606 B2 | 3/2005 | Ooyama |
| 6,949,045 B2 | 9/2005 | Wafzig et al. |
| 6,979,275 B2 | 12/2005 | Hiraku et al. |
| 6,986,725 B2 | 1/2006 | Morscheck |
| 7,033,298 B2 | 4/2006 | Usoro et al. |
| 7,074,154 B2 | 7/2006 | Miller |
| 7,086,981 B2 | 8/2006 | Ali et al. |
| 7,104,917 B2 | 9/2006 | Klemen et al. |
| 7,128,681 B2 | 10/2006 | Sugino et al. |
| 7,160,220 B2 | 1/2007 | Shinojima et al. |
| 7,186,199 B1 | 3/2007 | Baxter et al. |
| 7,217,214 B2 | 5/2007 | Morscheck |
| 7,234,543 B2 | 6/2007 | Schaaf |
| 7,288,044 B2 | 10/2007 | Gumpoltsberger |
| 7,335,126 B2 | 2/2008 | Tsuchiya et al. |
| 7,347,801 B2 | 3/2008 | Guenter et al. |
| 7,396,309 B2 | 7/2008 | Heitz et al. |
| 7,431,677 B2 | 10/2008 | Miller et al. |
| 7,470,210 B2 | 12/2008 | Miller et al. |
| 7,473,202 B2 | 1/2009 | Morscheck et al. |
| 7,485,069 B2 | 2/2009 | Jang et al. |
| 7,497,798 B2 | 3/2009 | Kim |
| 7,588,514 B2 | 9/2009 | McKenzie et al. |
| 7,637,838 B2 | 12/2009 | Gumpoltsberger |
| 7,672,770 B2 | 3/2010 | Inoue et al. |
| 7,686,729 B2 | 3/2010 | Miller et al. |
| 7,717,815 B2 | 5/2010 | Tenberge |
| 7,727,107 B2 | 6/2010 | Miller |
| 7,780,566 B2 | 8/2010 | Sea |
| 7,874,153 B2 | 1/2011 | Bhem |
| 7,878,935 B2 | 2/2011 | Lahr |
| 7,951,035 B2 | 5/2011 | Platt |
| 7,980,972 B1 | 6/2011 | Starkey et al. |
| 8,029,401 B2 | 10/2011 | Johnson |
| 8,052,569 B2 | 11/2011 | Tabata et al. |
| 8,062,175 B2 | 11/2011 | Krueger et al. |
| 8,066,614 B2 | 11/2011 | Miller et al. |
| 8,142,323 B2 | 3/2012 | Tsuchiya et al. |
| 8,226,518 B2 | 7/2012 | Parraga Gimeno |
| 8,257,216 B2 | 9/2012 | Hoffman |
| 8,257,217 B2 | 9/2012 | Hoffman |
| 8,287,414 B2 | 10/2012 | Weber et al. |
| 8,313,404 B2 | 11/2012 | Carter et al. |
| 8,376,903 B2 | 2/2013 | Pohl et al. |
| 8,382,636 B2 | 2/2013 | Shiina et al. |
| 8,447,480 B2 | 5/2013 | Usukura |
| 8,469,856 B2 | 6/2013 | Thomassy |
| 8,545,368 B1 | 10/2013 | Davis et al. |
| 8,594,867 B2 | 11/2013 | Heap et al. |
| 8,622,871 B2 | 1/2014 | Hoff |
| 8,639,419 B2 | 1/2014 | Roli et al. |
| 8,668,614 B2 | 3/2014 | Sherrill et al. |
| 8,678,975 B2 | 3/2014 | Koike |
| 8,870,711 B2 | 10/2014 | Pohl et al. |
| 8,888,643 B2 | 11/2014 | Lahr et al. |
| 8,926,468 B2 | 1/2015 | Versteyhe et al. |
| 8,986,150 B2 | 3/2015 | Versteyhe et al. |
| 9,052,000 B2 * | 6/2015 | Cooper ............ F16H 15/52 |
| 9,114,799 B2 | 8/2015 | Tsukamoto et al. |
| 9,156,463 B2 | 10/2015 | Legner |
| 9,551,404 B2 * | 1/2017 | Ziech ............ F16H 15/52 |
| 2002/0004438 A1 | 1/2002 | Toukura et al. |
| 2002/0094911 A1 | 7/2002 | Haka |

(56) References Cited

U.S. PATENT DOCUMENTS

| | | |
|---|---|---|
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0112424 A1 | 4/2009 | Dahl et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca Alves et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0111683 A1 | 4/2015 | Versteyhe et al. |
| 2015/0111693 A1 | 4/2015 | Wang et al. |
| 2015/0142281 A1 | 5/2015 | Versteyhe et al. |
| 2015/0159741 A1 | 6/2015 | Versteyhe et al. |
| 2015/0198246 A1 | 7/2015 | Callaway et al. |
| 2015/0204429 A1 | 7/2015 | Versteyhe et al. |
| 2015/0204430 A1 | 7/2015 | Versteyhe et al. |
| 2015/0226294 A1 | 8/2015 | Ziech et al. |
| 2015/0226298 A1 | 8/2015 | Versteyhe et al. |
| 2015/0226299 A1 | 8/2015 | Cooper et al. |
| 2015/0252881 A1 | 9/2015 | Versteyhe |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0069442 A1 | 3/2016 | Versteyhe et al. |
| 2016/0109001 A1 | 4/2016 | Schoolcraft |
| 2016/0131235 A1 | 5/2016 | Phillips |
| 2016/0195173 A1 | 7/2016 | Versteyhe et al. |
| 2016/0195177 A1 | 7/2016 | Versteyhe et al. |
| 2016/0319731 A1 | 11/2016 | Versteyhe et al. |
| 2016/0356366 A1 | 12/2016 | Versteyhe et al. |

FOREIGN PATENT DOCUMENTS

| | | |
|---|---|---|
| CN | 101617146 A | 12/2009 |
| CN | 102297255 A | 12/2011 |
| CN | 102338208 A | 2/2012 |
| CN | 202392067 U | 8/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 1174645 A2 | 1/2002 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2011153583 A | 8/2011 |
| WO | 2006002457 A1 | 1/2006 |
| WO | 2006041718 A2 | 4/2006 |
| WO | 2006109158 A1 | 10/2006 |
| WO | 2007046722 A1 | 4/2007 |
| WO | 2007051827 A1 | 5/2007 |
| WO | 2008101070 A2 | 8/2008 |
| WO | 2008103543 A1 | 8/2008 |
| WO | 2011011991 A1 | 2/2011 |
| WO | 2012008884 A1 | 1/2012 |
| WO | 2012177187 A1 | 12/2012 |
| WO | 2013109723 A1 | 7/2013 |
| WO | 2013123117 A1 | 8/2013 |
| WO | 2014039438 A2 | 3/2014 |
| WO | 2014039439 A1 | 3/2014 |
| WO | 2014039440 A1 | 3/2014 |
| WO | 2014039447 A1 | 3/2014 |
| WO | 2014039448 A2 | 3/2014 |
| WO | 2014039708 A1 | 3/2014 |
| WO | 2014039713 A1 | 3/2014 |
| WO | 2014039846 A2 | 3/2014 |

(56) References Cited

FOREIGN PATENT DOCUMENTS

| WO | 2014039900 A1 | 3/2014 |
|---|---|---|
| WO | 2014039901 A1 | 3/2014 |
| WO | 2014078583 A1 | 5/2014 |
| WO | 2014124291 A1 | 8/2014 |
| WO | 2014151889 A2 | 9/2014 |
| WO | 2014159755 A2 | 10/2014 |
| WO | 2014159756 A2 | 10/2014 |
| WO | 2014165259 A1 | 10/2014 |
| WO | 2014179717 A1 | 11/2014 |
| WO | 2014179719 A1 | 11/2014 |
| WO | 2014186732 A1 | 11/2014 |
| WO | 2014197711 A1 | 12/2014 |
| WO | 2015059601 A1 | 4/2015 |
| WO | 2015073883 A1 | 5/2015 |
| WO | 2015073887 A1 | 5/2015 |
| WO | 2015073948 A2 | 5/2015 |
| WO | 2015195759 A2 | 12/2015 |
| WO | 2015200769 A1 | 12/2015 |
| WO | 2016094254 A1 | 6/2016 |
| WO | 2016168439 A1 | 10/2016 |
| WO | 2016178913 A1 | 11/2016 |
| WO | 2016205639 A1 | 12/2016 |
| WO | 2017027404 A1 | 2/2017 |

OTHER PUBLICATIONS

Moore, C. A. et al. A Three Revolute Cobot Using CVTs in Parallel, Proceedings of IMECE, 1999, 6 pgs.
Wong. The Temple of VTEC Asia Special Focus on the Multimatic Transmission. Temple of VTEC Asia. Oct. 2000.

\* cited by examiner

| $r_i > r_o$ | $r_i = r_o$ | $r_i < r_o$ |
| Underdrive | 1:1 | Overdrive |

CONTINUOUSLY VARIABLE TRANSMISSION AND AN INFINITELY VARIABLE TRANSMISSION VARIATOR DRIVE

RELATED APPLICATIONS

The present application is a continuation application of U.S. patent application Ser. No. 14/769,296 filed on Aug. 20, 2015 and granted as U.S. Pat. No. 9,551,404. U.S. patent application Ser. No. 14/796,296 claims priority to and benefit from Provisional U.S. Patent Application Ser. No. 61/785,793 filed on Mar. 14, 2013. The content of the above-noted patent applications are hereby expressly incorporated by reference into the detailed description of the present application.

BACKGROUND FOR THE PRESENT DISCLOSURE

A vehicle having a driveline including a continuously variable transmission allows an operator of the vehicle or a control system of the vehicle to vary a drive ratio in a stepless manner, permitting a power source of the vehicle to operate at its most efficient rotational speed. Further, the continuously variable transmission may be configured to be an infinitely variable transmission, wherein the vehicle can be steplessly shifted from a forward mode to a neutral mode or even to a reverse mode. Continuously variable transmissions known in the art tend to have limited ratio ranges and typically require the use of a torque convertor or a separate clutching mechanism to facilitate stopping and starting the vehicle.

SUMMARY OF THE PRESENT DISCLOSURE

Provided herein is a transmission having a variator drive capable of being placed in a continuously variable operating mode or an infinitely variable operating mode, capable of having a wide ratio range, and capable of integrating a clutching capability within the transmission. The ratio range resulting from the configurations described herein, or obvious to one of skill in the art having read such disclosure will be wider than the variator range and sufficient for a vehicle.

Provided herein is a variable transmission comprising: an input shaft; an output shaft; and a first ring assembly rotatably disposed in a housing selectively drivingly engaged with the input shaft using a clutch, the first ring assembly configured to be prevented from rotating relative to the housing by a grounding clutch and the first ring assembly comprising a first variator ball engagement surface that is in driving engagement with a plurality of variator balls. The variable transmission, in certain embodiments, further comprises a variator carrier assembly rotatably disposed in the housing and drivingly engaged with the input shaft using a sun gear on the input shaft, a plurality of planet gears rotatably disposed in the variator carrier assembly, and a fixed ring gear coupled to the housing, the variator carrier assembly comprising an annular arrangement of the plurality of tiltable variator balls each having ball axle shafts. The variable transmission, in certain embodiments, further comprises a second ring assembly rotatably disposed in the housing drivingly engaged with the output shaft, the second ring assembly comprising a second variator ball engagement surface that is in driving engagement with each of the variator balls. The variable transmission, in certain embodiments, has an infinitely variable operating mode and a continuously variable operating mode.

In some embodiments, the input shaft and the output shaft are at least partially disposed in the housing.

In some embodiments, the input shaft is drivingly engaged with a torsional dampener disposed between an engine and the variable transmission.

In some embodiments, a first middle portion of the input shaft is selectively drivingly engaged with the first ring assembly. In some embodiments, a second middle portion of the input shaft is selectively drivingly engaged with the variator carrier assembly. In some embodiments, a second middle portion of the input shaft forms the sun gear and is drivingly engaged with the variator carrier assembly.

In some embodiments, the input shaft is drivingly engaged with a pump.

In some embodiments, the clutch comprises a wet plate clutch, a dry plate clutch, a cone clutch, or any other clutch type that may be variably engaged. In some embodiments, the variator carrier assembly comprises a brake clutch which is configured to place the variable transmission in a parking condition.

In some embodiments, the plurality of planet gears are drivingly engaged with the sun gear formed on the input shaft and with the fixed ring gear coupled to the housing.

In some embodiments, the first ring assembly comprises a clutch engagement portion. In some embodiments, the clutch engagement portion extends inwardly from an inner surface of the first ring assembly. In some embodiments, the first ring assembly comprises a grounding clutch engagement portion. In some embodiments, the grounding clutch engagement portion extends outwardly from a surface of the first ring assembly. In some embodiments, the grounding clutch engagement portion extends outwardly from an outer surface of the first ring assembly. In some embodiments, the grounding clutch is at least partially disposed on an inner surface of the housing. In some embodiments, the grounding clutch is selectively variably engaged to militate against a relative rotation from occurring between the first ring assembly and the housing.

In some embodiments, an output gear formed on an outer surface of the second ring assembly is in driving engagement with a first end of the output shaft. In some embodiments, the output shaft comprises a first end drivingly engaged with second ring assembly through a first output shaft gear formed in the output shaft. In some embodiments, the output shaft comprises a second end drivingly engaged with a vehicle output through a second output shaft gear formed in the output shaft. In some embodiments, the first output shaft gear and the second output shaft gear have differing diameters to adjust a drive ratio between the second ring assembly and the vehicle output.

In some embodiments, the infinitely variable operating mode exists when the clutch is placed in a disengaged position, and the grounding clutch is placed in an engaged position. In some embodiments, the continuously variable operating mode exists when the clutch is placed in an engaged position, and the grounding clutch is placed in a disengaged position. In some embodiments, in the continuously variable operating mode the first ring assembly and the variator carrier assembly rotate in similar directions but at differing rates. In some embodiments, a mode of the transmission depends on the engagement status of the clutch and the grounding clutch.

Provided herein is a variable transmission comprising: an input shaft and a first ring assembly rotatably disposed in a housing, the first ring assembly drivingly engaged with the input shaft using a plurality of double planet gears rotatably disposed on the first ring assembly, the first ring assembly configured to be prevented from rotating relative to the housing by a second grounding clutch, and the first ring assembly comprising a first variator ball engagement surface that is in driving engagement with a plurality of tiltable variator balls. The variable transmission of some embodiments comprises a variator carrier assembly rotatably disposed in the housing and configured to be militated from rotating relative to the housing by a first grounding clutch, the variator carrier assembly comprising a drive shaft drivingly engaged using a second sun gear engaged with a second gear of each of the double planet gears, and an annular arrangement of the plurality of tiltable variator balls each having ball axle shafts. The variable transmission of some embodiments comprises a second ring assembly rotatably disposed in the housing drivingly engaged with a vehicle output, the second ring assembly comprising and a second variator ball engagement surface that is in driving engagement with each of the variator balls. In some embodiments, said transmission has an infinitely variable operating mode and a continuously variable operating mode.

In some embodiments, the input shaft is at least partially disposed in the housing.

In some embodiments, the input shaft is drivingly engaged with a torsional dampener disposed between an engine and the variable transmission.

In some embodiments, a first sun gear is formed on a second end of the input shaft and is drivingly engaged with a first gear of each of the double planet gears. In some embodiments, the first sun gear, the plurality of double planet gears, and the drive shaft form a ringless planetary gearset.

In some embodiments, the first ring assembly driven by the plurality of double planet gears when the variator carrier assembly is fixed is driven when the input shaft is rotated. In some embodiments, the variator carrier assembly driven by the plurality of double planet gears when the first ring assembly is fixed is driven when the input shaft is rotated.

In some embodiments, the variator carrier assembly comprises a first grounding clutch engagement portion that forms of the first grounding clutch. In some embodiments, the first grounding clutch engagement portion extends outwardly from a second end of the variator carrier assembly. In some embodiments, the first grounding clutch is at least partially disposed on an inner surface of the housing. In some embodiments, the first grounding clutch is configured to be selectively variably engaged to militate against a relative rotation from occurring between the variator carrier assembly and the housing. In some embodiments, the first grounding clutch is a plate clutch. In some embodiments, the first grounding clutch is a wet plate clutch, a dry plate clutch, a cone clutch, or any other clutch type that may be variably engaged. In some embodiments, the first ring assembly is selectively drivingly engaged with the input shaft using the first grounding clutch.

In some embodiments, the first ring assembly comprises a second grounding clutch engagement portion. In some embodiments, the second grounding clutch engagement portion extends outwardly from an outer surface of the first ring assembly. In some embodiments, the second grounding clutch is at least partially disposed on an inner surface of the housing. In some embodiments, the second grounding clutch may be selectively variably engaged to militate against a relative rotation from occurring between the first ring assembly and the housing. In some embodiments, the second grounding clutch is a plate clutch. In some embodiments, the second grounding clutch is a wet plate clutch, a dry plate clutch, a cone clutch, or any other clutch type that may be variably engaged. In some embodiments, the first variator carrier assembly may be selectively drivingly engaged with the input shaft using the second grounding clutch.

In some embodiments, the second ring assembly comprises an output gear formed in an outer surface of the second ring assembly. In some embodiments, the output gear is in driving engagement with the vehicle output.

In some embodiments, an operating mode of the variable transmission is dependent on an engagement status of the first grounding clutch and the second grounding clutch. In some embodiments, the continuously variable operating mode is achieved when the first grounding clutch is engaged and the second grounding clutch is disengaged. In some embodiments, the infinitely variable operating mode is achieved when the first grounding clutch is disengaged and the second grounding clutch is engaged Provided herein is a variable transmission comprising: an input member; an output shaft; and a first ring assembly rotatably disposed in a housing, the first ring assembly selectively drivingly engaged with the input member using a first clutch, the first ring assembly configured to be prevented from rotating relative to the housing by a second grounding clutch, and the first ring assembly comprising a first variator ball engagement surface that is in driving engagement with a plurality of variator balls. In some embodiments, the variable transmission comprises a variator carrier assembly rotatably disposed in the housing and selectively drivingly engaged with the input member using a second clutch, the variator carrier assembly comprising a first grounding clutch engagement portion that selectively variably engages a portion of the first grounding clutch to mitigate against relative rotation between the first ring assembly and the housing, and an annular arrangement of the plurality of variator balls each having ball axle shafts. In some embodiments, the variable transmission comprises a second ring assembly rotatably disposed in the housing drivingly engaged with the output shaft, the second ring assembly comprising and a second variator ball engagement surface that is in driving engagement with each of the variator balls. In some embodiments, the variable transmission has an infinitely variable operating mode and a continuously variable operating mode.

In some embodiments, the input member and the output shaft are at least partially disposed in the housing.

In some embodiments, the input member has a first end drivingly engaged with a pump. In some embodiments, the input member is drivingly engaged with an engine. In some embodiments, the input member is drivingly engaged to the engine through at least one or more of a dampener and a pump. In some embodiments, the dampener is a torsional dampener.

In some embodiments, a second end inner surface of the input member is selectively drivingly engaged with the first ring assembly using the first clutch. In some embodiments, the first clutch is a wet plate clutch, a dry plate clutch, a cone clutch, or any other clutch type that may be variably engaged.

In some embodiments, the first ring assembly comprises a first clutch engagement portion. In some embodiments, the first clutch engagement portion extends outwardly from a distal end of the first ring assembly. In some embodiments, the first clutch engagement portion is a portion of the first clutch.

In some embodiments, the first ring assembly comprises a second grounding clutch engagement portion. In some embodiments, the second grounding clutch engagement portion extends outwardly from a distal end of the first ring assembly. In some embodiments, the second grounding clutch engagement portion is a portion of the second grounding clutch. In some embodiments, the second grounding clutch is at least partially disposed on an inner surface of the housing. In some embodiments, the second grounding clutch is selectively variably engaged to militate against a relative rotation from occurring between the first ring assembly and the housing.

In some embodiments, a second end outer surface of the input member is selectively drivingly engaged with the variator carrier assembly using the second clutch. In some embodiments, the second clutch is a wet plate clutch, a dry plate clutch, a cone clutch, or any other clutch type that may be variably engaged.

In some embodiments, the variator carrier assembly comprises a second clutch engagement portion. In some embodiments, the second clutch engagement portion extends inwardly from an inner surface of the variator carrier assembly. In some embodiments, the second clutch engagement portion is a portion of the second clutch. In some embodiments, when the second clutch is placed in an engaged position the variator carrier assembly is drivingly engaged with the input member.

In some embodiments, a distal end of the variator carrier assembly comprises the first grounding clutch engagement portion. In some embodiments, first grounding clutch engagement portion extends outwardly from an outer surface of the first ring assembly. In some embodiments, the first grounding clutch engagement portion forms a portion of the first grounding clutch.

In some embodiments, the second ring assembly comprises an output gear formed in an outer surface thereof. In some embodiments, the second ring assembly is in driving engagement with a first end of the output shaft. In some embodiments, the output shaft comprises a first end drivingly engaged with the second ring assembly through a first gear formed in the output shaft and a second end drivingly engaged with the vehicle output through a second gear formed in the output shaft. In some embodiments, the first gear and the second gear have differing diameters to adjust a drive ratio between the second ring assembly and the vehicle output.

In some embodiments, an operating mode of the variable transmission is dependent on an engagement status of the first clutch, the second clutch, the first grounding clutch, and the second grounding clutch.

In some embodiments, the continuously variable operating mode is achieved when the first clutch is placed in the engaged position, the second clutch is placed in a disengaged position, the first grounding clutch is placed in the engaged position, and the second grounding clutch is placed in a disengaged position. In some embodiments, when in the continuously variable operating mode, the first ring assembly is drivingly engaged with the first ring assembly input shaft. In some embodiments, when in the continuously variable operating mode, each of the variator balls rotate about their axis to transfer torque from the first ring assembly to the second ring assembly, and to a vehicle output through the output shaft. In some embodiments, when in the continuously variable operating mode and when the ball axle shafts are tilted within the variator carrier assembly, a drive ratio between the first ring assembly and the second ring assembly is adjusted.

In some embodiments, the infinitely variable operating mode is achieved when the first clutch is placed in a disengaged position, the second clutch is placed in the engaged position, the first grounding clutch is placed in a disengaged position, and the second grounding clutch is placed in the engaged position. In some embodiments, when in the infinitely variable operating mode, the variator carrier assembly is drivingly engaged with the first ring assembly input shaft and the first ring assembly is fixed with respect to the housing. In some embodiments, when in the infinitely variable operating mode, and when the ball axle shafts are tilted within the variator carrier assembly, a drive ratio between the variator carrier assembly and the second ring assembly is adjusted to one of a forward operating mode, a powered neutral, and a reverse operating mode.

In some embodiments, the variable transmission comprises an axial force generator configured to generate sufficient axial force to properly operate the vehicle transmission. In some embodiments, the axial force generator comprises one or more clamping mechanisms. In some embodiments, the axial force generator comprises a ball ramp. In some embodiments, the axial force generator comprises a ball ramp thrust ring. In some embodiments, the axial force generator comprises a load applied during assembly of the variable transmission.

In some embodiments, each of the ball axle shafts is adjusted using a cam style tilting mechanism. In some embodiments, each of the ball axle shafts is adjusted using a split carrier axle skewing mechanism.

In some embodiments, the first variator ball engagement surface is formed in a distal end of the first ring assembly. In some embodiments, the first variator ball engagement surface is formed in an input ring of the first ring assembly. In some embodiments, the second variator ball engagement surface is formed in a distal end of the first ring assembly. In some embodiments, the first variator ball engagement surface is a conical surface or a concave toroidal surface in contact with or slightly spaced apart from each of the variator balls. In some embodiments, the second variator ball engagement surface is a conical surface or a concave toroidal surface in contact with or slightly spaced apart from each of the variator balls. In some embodiments, the first variator ball engagement surface is in driving engagement with each of the variator balls through one of a boundary layer type friction and an elastohydrodynamic film. In some embodiments, the second variator ball engagement surface is in driving engagement with each of the variator balls through one of a boundary layer type friction and an elastohydrodynamic film.

Provided herein is a vehicle driveline comprising the variable transmission of any arrangement disclosed herein or obvious to one of skill in the art upon reading the disclosure herein, wherein the variable transmission is disposed between an engine and a vehicle output. In some embodiments, the vehicle output comprises a differential and a drive axle.

In some embodiments, the vehicle driveline comprises a torsional dampener disposed between the engine and the variable transmission. In some embodiments, the torsional dampener comprises at least one torsional spring.

Provided herein is a method of changing from between a continuously variable transmission mode, and an infinitely variable transmission mode, comprising engaging or disengaging a clutch and a grounding clutch of the variable transmissions of any arrangement disclosed herein with reference to FIG. 1 or obvious to one of skill in the art upon reading the disclosure herein.

Provided herein is a method of changing from between a continuously variable transmission mode, and an infinitely variable transmission mode, comprising engaging or disengaging a first grounding clutch and a second grounding clutch of the variable transmissions of any arrangement disclosed herein with reference to FIG. 2 or obvious to one of skill in the art upon reading the disclosure herein.

Provided herein is a method of changing from between a continuously variable transmission mode, and an infinitely variable transmission mode, comprising engaging or disengaging first clutch, the second clutch, the first grounding clutch, and the second grounding clutch of the variable transmissions of any arrangement disclosed herein with reference to FIG. 3 or obvious to one of skill in the art upon reading the disclosure herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
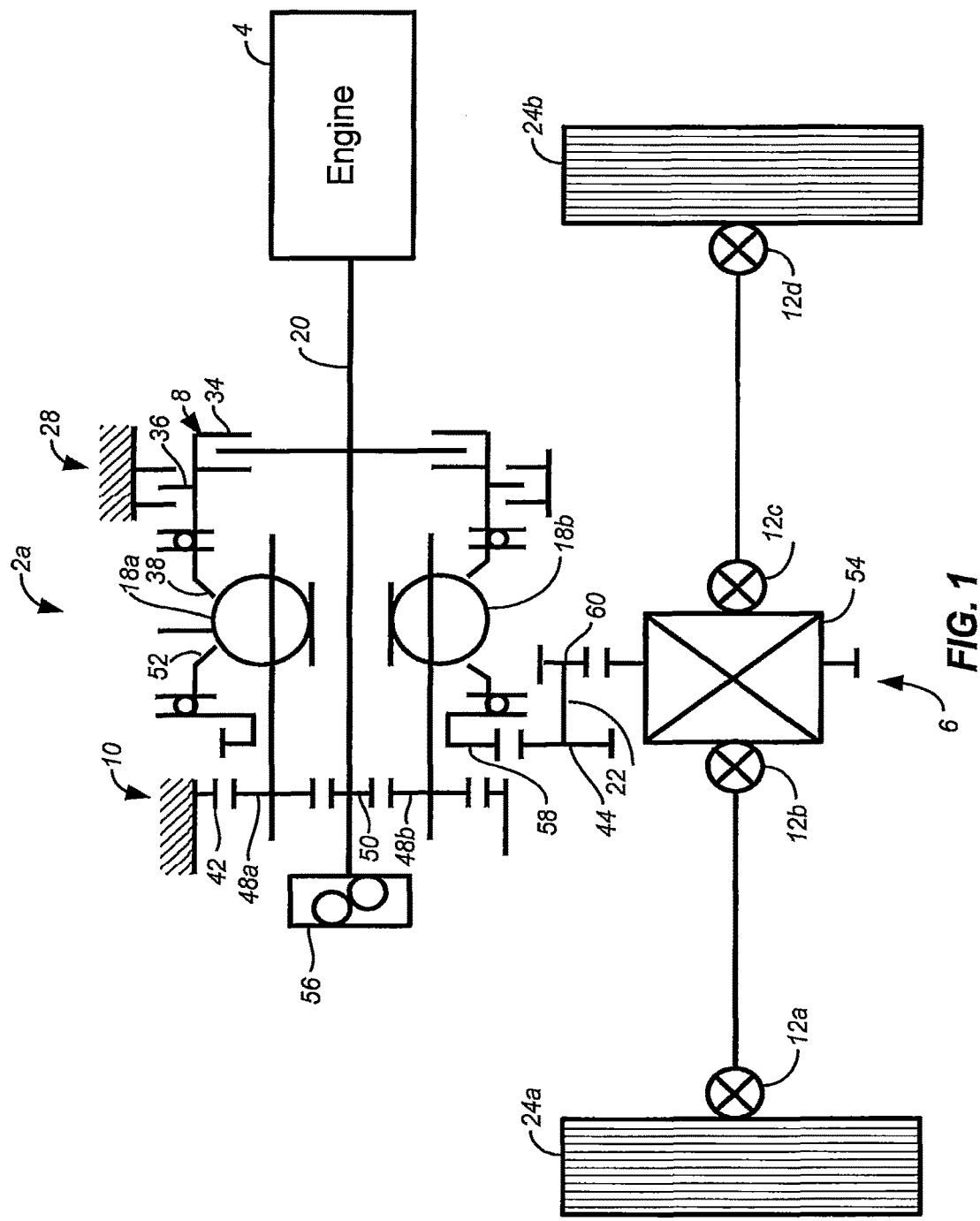
FIG. 1 depicts an embodiment of a vehicle driveline comprising a variable transmission including a planetary gearset located between an engine and a vehicle output.

Provided herein is a transmission having a variator drive capable of being placed in a continuously variable operating mode or an infinitely variable operating mode, capable of having a wide ratio range, and capable of integrating a clutching capability within the transmission. The ratio range resulting from the configurations described herein, or obvious to one of skill in the art having read such disclosure will be wider than the variator range and sufficient for a vehicle. Additional variable transmission details are described in U.S. application Ser. No. 13/743,951 filed Jan. 17, 2013, and/or PCT/US2013/026037 filed Feb. 14, 2013, incorporated herein by reference in their entirety.

In a vehicle, a variable transmission 2 *a*, 2 *b*, 2 *c* may be used to replace a conventional transmission and a clutch in a vehicle driveline. As a non-limiting example, the variable transmission 2 *a*, 2 *b*, 2 *c* that employ a ball type Continuously Variable Transmission (CVT, which is also known as CVP for constant variable planetary, herein) and may replace a conventional transmission and a clutch in a vehicle, such as a front wheel drive automobile. The transmissions disclosed herein may be used in any vehicle type that needs or uses a transmission.

Basic concepts of a ball type Continuously Variable Transmissions are described in US2006084549 and AU2011224083A1, incorporated herein by reference in their entirety. Such a CVT, adapted herein as described throughout this specification, comprises a number of balls, depending on the application, two discs with a conical surface contact with the balls, as input and output, and an idler as shown on FIG. 4. The type of CVT provided herein comprises a variator comprising a plurality of variator balls, depending on the application, two discs or annular rings 995, 996 each having an engagement portion that engages the variator balls 997, at least. The engagement portions are optionally in a conical or toroidal convex or concave surface contact with the variator balls, as input (995) and output (996). The variator optionally includes an idler 999 contacting the balls as well as shown on FIG. 4. The variator balls are mounted on axles 998, themselves held in a cage or carrier allowing charming the ratio by tilting the variator balls' axes. The balls are mounted on axes, themselves held in a cage or carrier allowing changing the ratio by tilting the ball's axes. Other types of ball CVTs also exist, like the one produced by Milner but are slightly different.

Figure 4:
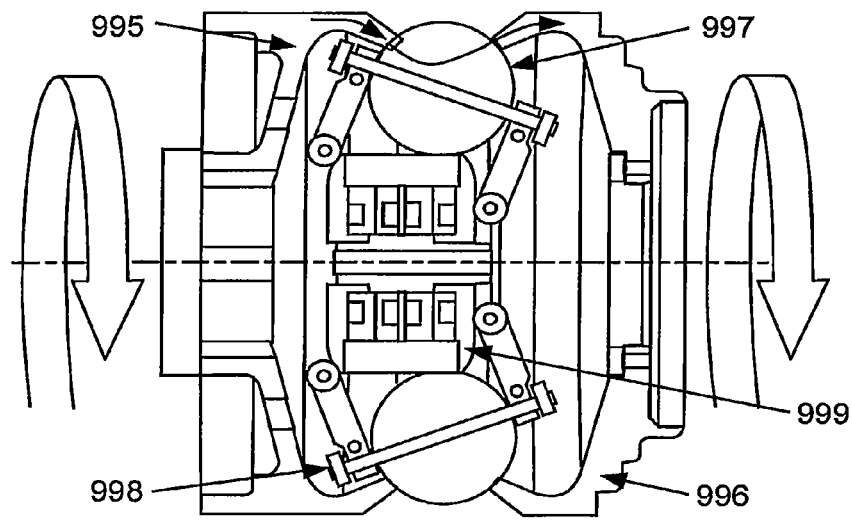
FIG. 4 is a cutaway view of a currently known and used continuously variable transmission (CVT).
Figure 5:
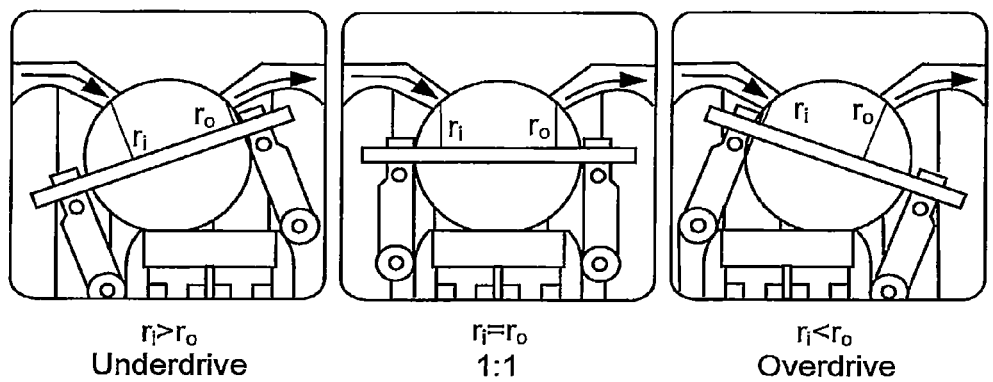
FIG. 5 is a magnified cutaway view of a ball and ring of the CVT of FIG. 4.

The working principle of such a CVT of FIG. 4 is shown on FIG. 5. The CVP itself works with a traction fluid. The lubricant between the ball and the conical rings acts as a solid at high pressure, transferring the power from the input ring, through the balls, to the output ring. By tilting the ball's axis, the ratio can be changed between input and output. When the axis is horizontal the ratio is one, when the axis is tilted the distance between the axis and the contact point change, modifying the overall ratio. All the ball's axes are tilted at the same time with a mechanism included in the cage. In a car, the CVT is used to replace traditional transmission and is located between the engine and the differential, at least.

Figure 2:
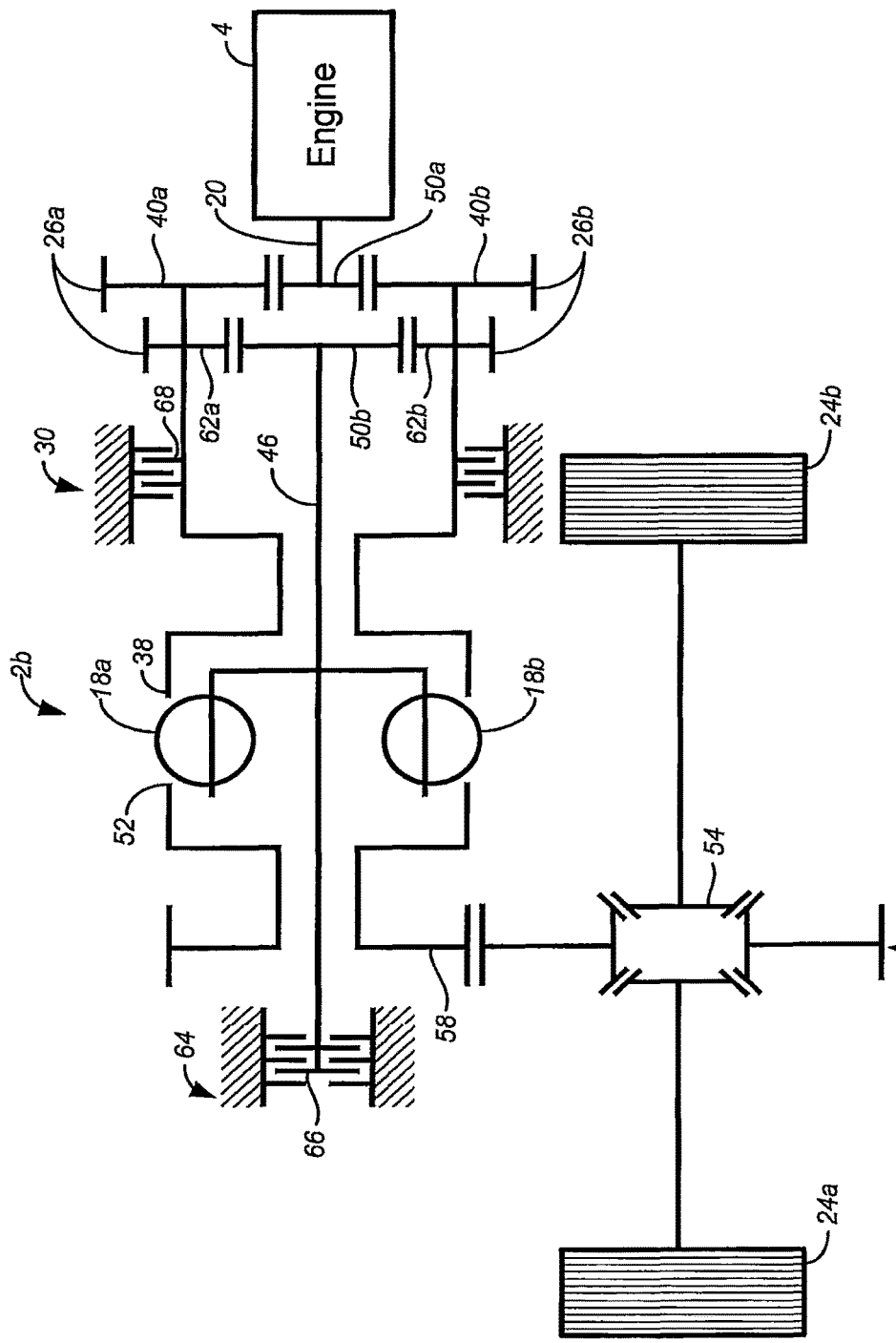
FIG. 2 depicts an embodiment of a variable transmission including a plurality of double planet gears located between an engine and a vehicle output.
Figure 3:
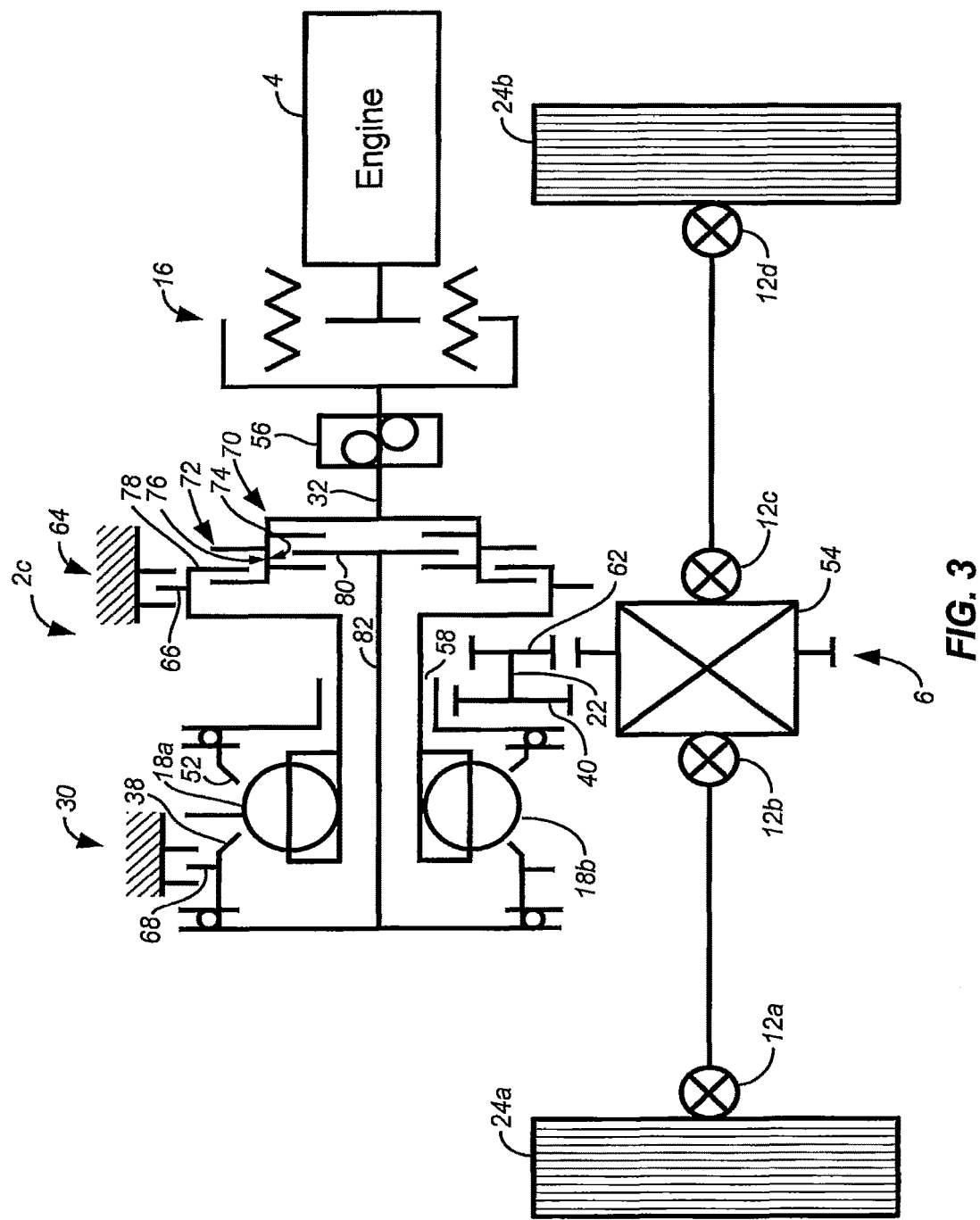
FIG. 3 depicts an embodiment of a variable transmission including two clutches and two grounding clutches located between an engine and a vehicle output.

The variable transmission 2 *a*, 2 *b*, 2 *c* is located between an engine 4 and a vehicle output 6 as shown in FIG. 1, 2, or 3. The vehicle output 6 is a differential 54 and a drive axle; however, it is understood that other vehicle outputs may be used. The vehicle output may comprise bearings 12 *a*, 12 *b*, 12 *c*, 12 *d*, (not shown in FIG. 2) and wheels 24 *a*, 24 *b* of the vehicle. A torsional dampener 16 (not shown in FIG. 1 or FIG. 2) may also be included, the torsional dampener 16 disposed between the engine 4 and the variable transmission 2 *a*, 2 *b* to reduce vibration and torque peaks.

Thus, provided herein is a variable transmission comprising: an input shaft; an output shaft; and a first ring assembly rotatably disposed in a housing selectively drivingly engaged with the input shaft using a clutch, the first ring assembly configured to be prevented from rotating relative to the housing by a grounding clutch and the first ring assembly comprising a first variator ball engagement surface that is in driving engagement with a plurality of variator balls. The variable transmission, in certain embodiments, further comprises a variator carrier assembly rotatably disposed in the housing and drivingly engaged with the input shaft using a sun gear on the input shaft, a plurality of planet gears rotatably disposed in the variator carrier assembly, and a fixed ring gear coupled to the housing, the variator carrier assembly comprising an annular arrangement of the plurality of tiltable variator balls each having ball axle shafts. The variable transmission, in certain embodiments, further comprises a second ring assembly rotatably disposed in the housing drivingly engaged with the output shaft, the second ring assembly comprising a second variator ball engagement surface that is in driving engagement with each of the variator balls. The variable transmission, in certain embodiments, has an infinitely variable operating mode and a continuously variable operating mode.

In some embodiments, the input shaft and the output shaft are at least partially disposed in the housing.

In some embodiments, the input shaft is drivingly engaged with a torsional dampener disposed between an engine and the variable transmission.

In some embodiments, a first middle portion of the input shaft is selectively drivingly engaged with the first ring assembly. In some embodiments, a second middle portion of the input shaft is selectively drivingly engaged with the variator carrier assembly. In some embodiments, a second middle portion of the input shaft forms the sun gear and is drivingly engaged with the variator carrier assembly.

In some embodiments, the input shaft is drivingly engaged with a pump.

In some embodiments, the clutch comprises a wet plate clutch, a dry plate clutch, a cone clutch, or any other clutch type that may be variably engaged. In some embodiments, the variator carrier assembly comprises a brake clutch which is configured to place the variable transmission in a parking condition.

In some embodiments, the plurality of planet gears are drivingly engaged with the sun gear formed on the input shaft and with the fixed ring gear coupled to the housing.

In some embodiments, the first ring assembly comprises a clutch engagement portion. In some embodiments, the clutch engagement portion extends inwardly from an inner surface of the first ring assembly. In some embodiments, the first ring assembly comprises a grounding clutch engagement portion. In some embodiments, the grounding clutch engagement portion extends outwardly from a surface of the first ring assembly. In some embodiments, the grounding clutch engagement portion extends outwardly from an outer surface of the first ring assembly. In some embodiments, the grounding clutch is at least partially disposed on an inner surface of the housing. In some embodiments, the grounding clutch is selectively variably engaged to militate against a relative rotation from occurring between the first ring assembly and the housing.

In some embodiments, an output gear formed on an outer surface of the second ring assembly is in driving engagement with a first end of the output shaft. In some embodiments, the output shaft comprises a first end drivingly engaged with second ring assembly through a first output shaft gear formed in the output shaft. In some embodiments, the output shaft comprises a second end drivingly engaged with a vehicle output through a second output shaft gear formed in the output shaft. In some embodiments, the first output shaft gear and the second output shaft gear have differing diameters to adjust a drive ratio between the second ring assembly and the vehicle output.

In some embodiments, the infinitely variable operating mode exists when the clutch is placed in a disengaged position, and the grounding clutch is placed in an engaged position. In some embodiments, the continuously variable operating mode exists when the clutch is placed in an engaged position, and the grounding clutch is placed in a disengaged position. In some embodiments, in the continuously variable operating mode the first ring assembly and the variator carrier assembly rotate in similar directions but at differing rates. In some embodiments, a mode of the transmission depends on the engagement status of the clutch and the grounding clutch.

Provided herein is a variable transmission comprising: an input shaft and a first ring assembly rotatably disposed in a housing, the first ring assembly drivingly engaged with the input shaft using a plurality of double planet gears rotatably disposed on the first ring assembly, the first ring assembly configured to be prevented from rotating relative to the housing by a second grounding clutch, and the first ring assembly comprising a first variator ball engagement surface that is in driving engagement with a plurality of tiltable variator balls. The variable transmission of some embodiments comprises a variator carrier assembly rotatably disposed in the housing and configured to be militated from rotating relative to the housing by a first grounding clutch, the variator carrier assembly comprising a drive shaft drivingly engaged using a second sun gear engaged with a second gear of each of the double planet gears, and an annular arrangement of the plurality of tiltable variator balls each having ball axle shafts. The variable transmission of some embodiments comprises a second ring assembly rotatably disposed in the housing drivingly engaged with a vehicle output, the second ring assembly comprising and a second variator ball engagement surface that is in driving engagement with each of the variator balls. In some embodiments, said transmission has an infinitely variable operating mode and a continuously variable operating mode.

In some embodiments, the input shaft is at least partially disposed in the housing.

In some embodiments, the input shaft is drivingly engaged with a torsional dampener disposed between an engine and the variable transmission.

In some embodiments, a first sun gear is formed on a second end of the input shaft and is drivingly engaged with a first gear of each of the double planet gears. In some embodiments, the first sun gear, the plurality of double planet gears, and the drive shaft form a ringless planetary gearset.

In some embodiments, the first ring assembly driven by the plurality of double planet gears when the variator carrier assembly is fixed is driven when the input shaft is rotated. In some embodiments, the variator carrier assembly driven by the plurality of double planet gears when the first ring assembly is fixed is driven when the input shaft is rotated.

In some embodiments, the variator carrier assembly comprises a first grounding clutch engagement portion that forms of the first grounding clutch. In some embodiments, the first grounding clutch engagement portion extends outwardly from a second end of the variator carrier assembly. In some embodiments, the first grounding clutch is at least partially disposed on an inner surface of the housing. In some embodiments, the first grounding clutch is configured to be selectively variably engaged to militate against a relative rotation from occurring between the variator carrier assembly and the housing. In some embodiments, the first grounding clutch is a plate clutch. In some embodiments, the first grounding clutch is a wet plate clutch, a dry plate clutch, a cone clutch, or any other clutch type that may be variably engaged. In some embodiments, the first ring assembly is selectively drivingly engaged with the input shaft using the first grounding clutch.

In some embodiments, the first ring assembly comprises a second grounding clutch engagement portion. In some embodiments, the second grounding clutch engagement portion extends outwardly from an outer surface of the first ring assembly. In some embodiments, the second grounding clutch is at least partially disposed on an inner surface of the housing, In some embodiments, the second grounding clutch may be selectively variably engaged to militate against a relative rotation from occurring between the first ring assembly and the housing. In some embodiments, the second grounding clutch is a plate clutch. In some embodiments, the second grounding clutch is a wet plate clutch, a dry plate clutch, a cone clutch, or any other clutch type that may be variably engaged. In some embodiments, the first variator carrier assembly may be selectively drivingly engaged with the input shaft using the second grounding clutch.

In some embodiments, the second ring assembly comprises an output gear formed in an outer surface of the second ring assembly. In some embodiments, the output gear is in driving engagement with the vehicle output.

In some embodiments, an operating mode of the variable transmission is dependent on an engagement status of the first grounding clutch and the second grounding clutch. In some embodiments, the continuously variable operating mode is achieved when the first grounding clutch is engaged and the second grounding clutch is disengaged. In some embodiments, the infinitely variable operating mode is achieved when the first grounding clutch is disengaged and the second grounding clutch is engaged.

Provided herein is a variable transmission comprising: an input member; an output shaft; and a first ring assembly rotatably disposed in a housing, the first ring assembly selectively drivingly engaged with the input member using a first clutch, the first ring assembly configured to be prevented from rotating relative to the housing by a second grounding clutch, and the first ring assembly comprising a first variator ball engagement surface that is in driving engagement with a plurality of variator balls. In some embodiments, the variable transmission comprises a variator carrier assembly rotatably disposed in the housing and selectively drivingly engaged with the input member using a second clutch, the variator carrier assembly comprising a first grounding clutch engagement portion that selectively variably engages a portion of the first grounding clutch to mitigate against relative rotation between the first ring assembly and the housing, and an annular arrangement of the plurality of variator balls each having ball axle shafts. In some embodiments, the variable transmission comprises a second ring assembly rotatably disposed in the housing drivingly engaged with the output shaft, the second ring assembly comprising and a second variator ball engagement surface that is in driving engagement with each of the variator balls. In some embodiments, the variable transmission has an infinitely variable operating mode and a continuously variable operating mode.

In some embodiments, the input member and the output shaft are at least partially disposed in the housing.

In some embodiments, the input member has a first end drivingly engaged with a pump. In some embodiments, the input member is drivingly engaged with an engine. In some embodiments, the input member is drivingly engaged to the engine through at least one or more of a dampener and a pump. In some embodiments, the dampener is a torsional dampener.

In some embodiments, a second end inner surface of the input member is selectively drivingly engaged with the first ring assembly using the first clutch. In some embodiments, the first clutch is a wet plate clutch, a dry plate clutch, a cone clutch, or any other clutch type that may be variably engaged.

In some embodiments, the first ring assembly comprises a first clutch engagement portion. In some embodiments, the first clutch engagement portion extends outwardly from a distal end of the first ring assembly. In some embodiments, the first clutch engagement portion is a portion of the first clutch.

In some embodiments, the first ring assembly comprises a second grounding clutch engagement portion. In some embodiments, the second grounding clutch engagement portion extends outwardly from a distal end of the first ring assembly. In some embodiments, the second grounding clutch engagement portion is a portion of the second grounding clutch. In some embodiments, the second grounding clutch is at least partially disposed on an inner surface of the housing. In some embodiments, the second grounding clutch is selectively variably engaged to militate against a relative rotation from occurring between the first ring assembly and the housing.

In some embodiments, a second end outer surface of the input member is selectively drivingly engaged with the variator carrier assembly using the second clutch. In some embodiments, the second clutch is a wet plate clutch, a dry plate clutch, a cone clutch, or any other clutch type that may be variably engaged.

In some embodiments, the variator carrier assembly comprises a second clutch engagement portion. In some embodiments, the second clutch engagement portion extends inwardly from an inner surface of the variator carrier assembly. In some embodiments, the second clutch engagement portion is a portion of the second clutch. In some embodiments, when the second clutch is placed in an engaged position the variator carrier assembly is drivingly engaged with the input member.

In some embodiments, a distal end of the variator carrier assembly comprises the first grounding clutch engagement portion. In some embodiments, first grounding clutch engagement portion extends outwardly from an outer surface of the first ring assembly. In some embodiments, the first grounding clutch engagement portion forms a portion of the first grounding clutch.

In some embodiments, the second ring assembly comprises an output gear formed in an outer surface thereof. In some embodiments, the second ring assembly is in driving engagement with a first end of the output shaft. In some embodiments, the output shaft comprises a first end drivingly engaged with the second ring assembly through a first gear formed in the output shaft and a second end drivingly engaged with the vehicle output through a second gear formed in the output shaft. In some embodiments, the first gear and the second gear have differing diameters to adjust a drive ratio between the second ring assembly and the vehicle output.

In some embodiments, an operating mode of the variable transmission is dependent on an engagement status of the first clutch, the second clutch, the first grounding clutch, and the second grounding clutch.

In some embodiments, the continuously variable operating mode is achieved when the first clutch is placed in the engaged position, the second clutch is placed in a disengaged position, the first grounding clutch is placed in the engaged position, and the second grounding clutch is placed in a disengaged position. In some embodiments, when in the continuously variable operating mode, the first ring assembly is drivingly engaged with the first ring assembly input shaft. In some embodiments, when in the continuously variable operating mode, each of the variator balls rotate about their axis to transfer torque from the first ring assembly to the second ring assembly, and to a vehicle output through the output shaft. In some embodiments, when in the continuously variable operating mode and when the ball axle shafts are tilted within the variator carrier assembly, a drive ratio between the first ring assembly and the second ring assembly is adjusted.

In some embodiments, the infinitely variable operating mode is achieved when the first clutch is placed in a disengaged position, the second clutch is placed in the engaged position, the first grounding clutch is placed in a disengaged position, and the second grounding clutch is placed in the engaged position. In some embodiments, when in the infinitely variable operating mode, the variator carrier assembly is drivingly engaged with the first ring assembly input shaft and the first ring assembly is fixed with respect to the housing. In some embodiments, when in the infinitely variable operating mode, and when the ball axle shafts are tilted within the variator carrier assembly, a drive ratio between the variator carrier assembly and the second ring assembly is adjusted to one of a forward operating mode, a powered neutral, and a reverse operating mode.

In some embodiments, the variable transmission comprises an axial force generator configured to generate sufficient axial force to properly operate the vehicle transmission. In some embodiments, the axial force generator comprises one or more clamping mechanisms. In some embodiments, the axial force generator comprises a ball ramp. In some embodiments, the axial force generator comprises a ball ramp thrust ring. In some embodiments, the axial force generator comprises a load applied during assembly of the variable transmission.

In some embodiments, each of the ball axle shafts is adjusted using a cam style tilting mechanism. In some embodiments, each of the ball axle shafts is adjusted using a split carrier axle skewing mechanism.

In some embodiments, the first variator ball engagement surface is formed in a distal end of the first ring assembly. In some embodiments, the first variator ball engagement surface is formed in an input ring of the first ring assembly. In some embodiments, the second variator ball engagement surface is formed in a distal end of the first ring assembly. In some embodiments, the first variator ball engagement surface is a conical surface or a concave toroidal surface in contact with or slightly spaced apart from each of the variator balls. In some embodiments, the second variator ball engagement surface is a conical surface or a concave toroidal surface in contact with or slightly spaced apart from each of the variator balls. In some embodiments, the first variator ball engagement surface is in driving engagement with each of the variator balls through one of a boundary layer type friction and an elastohydrodynamic film. In some embodiments, the second variator ball engagement surface is in driving engagement with each of the variator balls through one of a boundary layer type friction and an elastohydrodynamic film.

Provided herein is a vehicle driveline comprising the variable transmission of any arrangement disclosed herein or obvious to one of skill in the art upon reading the disclosure herein, wherein the variable transmission is disposed between an engine and a vehicle output. In some embodiments, the vehicle output comprises a differential and a drive axle.

In some embodiments, the vehicle driveline comprises a torsional dampener disposed between the engine and the variable transmission. In some embodiments, the torsional dampener comprises at least one torsional spring.

Provided herein is a method of changing from between a continuously variable transmission mode, and an infinitely variable transmission mode, comprising engaging or disengaging a clutch and a grounding clutch of the variable transmissions of any arrangement disclosed herein with reference to FIG. 1 or obvious to one of skill in the art upon reading the disclosure herein.

Provided herein is a method of changing from between a continuously variable transmission mode, and an infinitely variable transmission mode, comprising engaging or disengaging a first grounding clutch and a second grounding clutch of the variable transmissions of any arrangement disclosed herein with reference to FIG. 2 or obvious to one of skill in the art upon reading the disclosure herein.

Provided herein is a method of changing from between a continuously variable transmission mode, and an infinitely variable transmission mode, comprising engaging or disengaging first clutch, the second clutch, the first grounding clutch, and the second grounding clutch of the variable transmissions of any arrangement disclosed herein with reference to FIG. 3 or obvious to one of skill in the art upon reading the disclosure herein.

Thus, a first configuration of a vehicle driveline including a variable transmission 2 *a* according to an embodiment of the invention is shown in FIG. 1. The variable transmission 2 *a* includes an input shaft 20, a variator carrier assembly, a first ring assembly, a second ring assembly, and an output shaft 22. The input shaft 20 and the output shaft 22 are at least partially disposed in a housing (not shown). The variator carrier assembly, the first ring assembly, and the second ring assembly are rotatably disposed in the housing.

Ball ramps, indicated in FIG. 1 by a circle between a pair of vertical lines, making up a first thrust ring on the first ring assembly and a second thrust ring on the second ring assembly are disposed between components of the variable transmission 2 *a* as shown to generate an amount of axial force necessary for proper operation of the variable transmission; however, it is understood that the amount of axial force necessary for proper operation may be generated by a clamping mechanism (not shown) or as a load applied during assembling of the variable transmission.

The input shaft 20 has a first end drivingly engaged with the engine 4, a first middle portion which may be selectively drivingly engaged with the first ring assembly, a second middle portion drivingly engaged with the variator carrier assembly, and a second end drivingly engaged with a pump 56. The first middle portion may be selectively drivingly engaged with the first ring assembly using a clutch 8. The clutch 8 may be a wet plate clutch, a dry plate clutch, a cone clutch, or any other clutch type that may be variably engaged. The second middle portion forms a sun gear 50 and is drivingly engaged with the variator carrier assembly.

The variator carrier assembly is rotatably disposed in the housing and includes a plurality of ball axle shafts tiltably disposed therein in an annular arrangement. Each of the ball axle shafts includes a variator ball 18 *a*, 18 *b* rotatably disposed thereon. Each of the ball axle shafts may be adjusted using one of a cam style tilting mechanism and a split carrier axle skewing mechanism. Further, it is understood that the variator carrier assembly may include a brake clutch (not shown) which may be used to place the variable transmission in a parking condition. The variator carrier assembly includes a plurality of planet gears 48 *a*, 48 *b* rotatably disposed therein. The plurality of planet gears 48 *a*, 48 *b* are drivingly engaged with the sun gear 50 formed on the input shaft 20 and, thereby, with a fixed ring gear 42 coupled to the housing. The sun gear 50 formed on the input shaft 20, the plurality of planet gears 48 *a*, 48 *b*, and the fixed ring gear 42 form a planetary gearset 10. The plurality of planet gears 48 *a*, 48 *b*, and thus the variator carrier assembly, is driven when the input shaft 20 is rotated. The planet gears 48 *a*, 48 *b* are part of a planetary gearset 10. The sun gear 50 and the fixed ring gear 42 may also be considered part of the planetary gearset. 10.

The first ring assembly is an annular member rotatably disposed in the housing. As mentioned hereinabove, the first ring assembly may be selectively drivingly engaged with the input shaft 20 using the clutch 8. The first ring assembly includes a clutch engagement portion 34 extending inwardly from an inner surface of the first ring assembly. The first ring assembly includes a grounding clutch engagement portion 36 extending outwardly from a surface of the first ring assembly. The grounding clutch engagement portion 36 may extend outwardly from an outer surface of the first ring assembly. A grounding clutch 28 at least partially disposed on an inner surface of the housing may be selectively variably engaged to militate against a relative rotation from occurring between the first ring assembly and the housing. A first variator ball engagement surface 38 is formed in a distal end of the first ring assembly. The first variator ball engagement surface 38 may be a conical surface or a concave toroidal surface in contact with or slightly spaced apart from each of the variator balls 18 *a*, 18 *b*. The first variator ball engagement surface 38 is in driving engagement with each of the variator balls 18 *a*, 18 *b* through one of a boundary layer type friction and an elastohydrodynamic film.

The second ring assembly is an annular member rotatably disposed in the housing. The second ring assembly is drivingly engaged with the output shaft. An output gear 58 formed in an outer surface of the second ring assembly is in driving engagement with a first end of the output shaft 22 (output shaft end 44). A second variator ball engagement surface 52 is formed in a distal end of the second ring assembly. The second variator ball engagement surface 52 may be a conical surface or a concave toroidal surface in contact with or slightly spaced apart from each of the variator balls 18 *a*, 18 *b*. The second variator ball engagement surface 52 is in driving engagement with each of the variator balls 18 *a*, 18 *b* through one of a boundary layer type friction and an elastohydrodynamic film.

The output shaft 22 has the first end drivingly engaged with second ring assembly gear 58 through a first output shaft gear or end 44 formed in the output shaft 22 and a second end drivingly engaged with the vehicle output 6 through a second output shaft gear 60 formed in the output shaft 22. It is understood that the first output shaft gear or end 44 and the second output shaft gear 60 may have differing diameters to adjust a drive ratio between the second ring assembly and the vehicle output 6.

The variable transmission 2 *a* as shown in FIG. 1 may be operated in at least two different operating modes, depending on an engagement status of the clutch 8 and the grounding clutch 28. The variable transmission 2 *a* may be operated in a continuously variable operating mode when the clutch 8 is placed in an engaged position and the grounding clutch 28 is placed in a disengaged position. In the continuously variable operating mode, the first ring assembly and the variator carrier assembly rotate in similar directions (but at differing rates) due to the planetary gearset 10. The variable transmission 2 *a* may be operated in an infinitely variable operating mode when the clutch 8 is placed in a disengaged position and the grounding clutch 28 is placed in an engaged position.

A second configuration of a vehicle driveline including a variable transmission 2 *b* according to an embodiment of the invention is shown in FIG. 2. The variable transmission 2 *b* includes an input shaft 20, a variator carrier assembly, a first ring assembly, and a second ring assembly. The input shaft 20 is at least partially disposed in a housing (not shown). The variator carrier assembly, the first ring assembly, and the second ring assembly are rotatably disposed in the housing.

Ball ramps, not shown in FIG. 2, may make up a first thrust ring on the first ring assembly and a second thrust ring on the second ring assembly are disposed between components of the variable transmission 2 *b* as shown to generate an amount of axial force necessary for proper operation of the variable transmission; however, it is understood that the amount of axial force necessary for proper operation may be generated by a clamping mechanism (not shown) or as a load applied during assembling of the variable transmission.

The input shaft 20 has a first end drivingly engaged with the engine and a second end drivingly engaged with the first ring assembly through a plurality of double planet gears 26 *a*, 26 *b* rotatably disposed on the first ring assembly. A first sun gear 50 *a* is formed on the second end of the input shaft 20 and is drivingly engaged with a first gear 40 *a*, 40 *b* of each of the double planet gears 26 *a*, 26 *b*.

The variator carrier assembly is rotatably disposed in the housing and includes a plurality of ball axle shafts tiltably disposed therein in an annular arrangement. Each of the ball axle shafts includes a variator ball 18 *a*, 18 *b* rotatably disposed thereon. Each of the ball axle shafts may be adjusted using one of a cam style tilting mechanism and a split carrier axle skewing mechanism. The variator carrier assembly includes a drive shaft 46 formed in a first end thereof. The drive shaft is drivingly engaged using a second sun gear 50 *b* with a second gear 62 *a*, 62 *b* of each of the double planet gears 26 *a*, 26 *b*. The first sun gear 50 *a* is formed on the input shaft. The first sun gear 50 *a* along with the plurality of double planet gears 26 *a*, 26 *b* and the drive shaft 46 form a ringless planetary gearset. The sun gear 50 *b* is formed on the drive shaft 46. The first ring assembly (driven by the plurality of double planet gears 26 *a*, 26 *b* when the variator carrier assembly is fixed) or the variator carrier assembly (driven by the plurality of double planet gears 26 *a*, 26 *b* when the first ring assembly is fixed) may be driven when the input shaft 20 is rotated.

The variator carrier assembly includes a first grounding clutch engagement portion 66 extending outwardly from a second end of the variator carrier assembly. A first grounding clutch 64 at least partially disposed on an inner surface of the housing may be selectively variably engaged to militate against a relative rotation from occurring between the variator carrier assembly and the housing. As shown in FIG. 2, the first grounding clutch 64 is a plate clutch. The first grounding clutch 64 may be a wet plate clutch, a dry plate clutch, a cone clutch, or any other clutch type that may be variably engaged. The first ring assembly may be selectively drivingly engaged with the input shaft using the first grounding clutch 64.

The first ring assembly is an annular member rotatably disposed in the housing. The first ring assembly includes a second grounding clutch engagement portion 68 extending outwardly from an outer surface of the first ring assembly. A second grounding clutch 30 at least partially disposed on an inner surface of the housing may be selectively variably engaged to militate against a relative rotation from occurring between the first ring assembly and the housing. As shown in FIG. 2, the second grounding clutch 30 is a plate clutch. The second grounding clutch 30 may be a wet plate clutch, a dry plate clutch, a cone clutch, or any other clutch type that may be variably engaged. The first variator carrier assembly may be selectively drivingly engaged with the input shaft 20 using the second grounding clutch 30.

A first variator ball engagement surface 38 is formed in a distal end of the first ring assembly. The first variator ball engagement surface 38 may be a conical surface or a concave toroidal surface in contact with or slightly spaced apart from each of the variator balls 18 a, 18 b. The first variator ball engagement surface 38 is in driving engagement with each of the variator balls 18 a, 18 b through one of a boundary layer type friction and an elastohydrodynamic film.

The second ring assembly is an annular member rotatably disposed in the housing. The second ring assembly is drivingly engaged with the vehicle output. An output gear 58 formed in an outer surface of the second ring assembly is in driving engagement with the vehicle output 6. A second variator ball engagement surface 52 is formed in a distal end of the second ring assembly. The second variator ball engagement surface 52 may be a conical surface or a concave toroidal surface in contact with or slightly spaced apart from each of the variator balls 18 a, 18 b. The second variator ball engagement surface 52 is in driving engagement with each of the variator balls 18 a, 18 b through one of a boundary layer type friction and an elastohydrodynamic film.

The variable transmission as shown in FIG. 2 may be operated in at least two different operating modes, depending on an engagement status of the first grounding clutch 64 and the second grounding clutch 30. The variable transmission may be operated in a continuously variable operating mode when the first grounding clutch 64 is placed in an engaged position and the second grounding clutch 30 is placed in a disengaged position. The variable transmission may be operated in an infinitely variable operating mode when the first grounding clutch 64 is placed in a disengaged position and the second grounding clutch 30 is placed in an engaged position.

A third configuration of a vehicle driveline including a variable transmission according to an embodiment of the invention is shown in FIG. 3. The variable transmission includes an input member 32, a variator carrier assembly, a first ring assembly, a second ring assembly, and an output shaft 22. The input member 32 and the output shaft 22 are at least partially disposed in a housing (not shown). The variator carrier assembly, the first ring assembly, and the second ring assembly are rotatably disposed in the housing.

Ball ramps, indicated in FIG. 3 by a circle between a pair of vertical lines, making up a first thrust ring on the first ring assembly and a second thrust ring on the second ring assembly are disposed between components of the variable transmission 2 c as shown to generate an amount of axial force necessary for proper operation of the variable transmission; however, it is understood that the amount of axial force necessary for proper operation may be generated by a clamping mechanism (not shown) or as a load applied during assembling of the variable transmission.

The input member 32 has a first end drivingly engaged with a pump 56, a second end inner surface, and a second end outer surface. As shown in FIG. 3, the input member 32 is drivingly engaged with an engine 4 through a dampener 16 and the pump 56; however, it is understood that the input member 32 may be directly drivingly engaged with the engine 4. The second end inner surface 74 may be selectively drivingly engaged with the first ring assembly using a first clutch 70. The first clutch 70 may be a wet plate clutch, a dry plate clutch, a cone clutch, or any other clutch type that may be variably engaged. The second end outer surface 76 may be selectively drivingly engaged with the variator carrier assembly using a second clutch 72. The second clutch 72 may be a wet plate clutch, a dry plate clutch, a cone clutch, or any other clutch type that may be variably engaged.

The variator carrier assembly is rotatably disposed in the housing and includes a plurality of ball axle shafts tiltably disposed therein in an annular arrangement. Each of the ball axle shafts includes a variator ball 18 a, 18 b rotatably disposed thereon. Each of the ball axle shafts may be adjusted using one of a cam style tilting mechanism and a split carrier axle skewing mechanism. A distal end of the variator carrier assembly includes a second clutch engagement portion 78 extending inwardly from an inner surface of the variator carrier assembly; the second clutch engagement portion 78 forming a portion of the second clutch 72. When the second clutch 72 is placed in an engaged position the variator carrier assembly is drivingly engaged with the input member 32. The variator carrier assembly also includes a first grounding clutch engagement portion 66 extending outwardly from an outer surface of the variator carrier assembly at the distal end thereof. A first grounding clutch 64 at least partially disposed on an inner surface of the housing may be selectively variably engaged with the first grounding clutch engagement portion 66 to militate against a relative rotation from occurring between the variator carrier assembly and the housing.

The first ring assembly is an annular member rotatably disposed in the housing. As mentioned hereinabove, the first ring assembly may be selectively drivingly engaged with the input member 32 using the first clutch 70. The first ring assembly includes a first clutch engagement portion 80 extending outwardly from the first ring assembly input shaft 82 at a first distal end thereof. The first ring assembly also includes a second grounding clutch engagement portion 68 extending outwardly from an outer surface of the first ring assembly at a second distal end thereof. A second grounding clutch 30 at least partially disposed on an inner surface of the housing may be selectively variably engaged to militate against a relative rotation from occurring between the first ring assembly and the housing. A first variator ball engagement surface 38 is formed in the first ring assembly. The first variator ball engagement surface 38 may be a conical surface or a concave toroidal surface in contact with or slightly spaced apart from each of the variator balls 18 a, 18 b. The first variator ball engagement surface 38 is in driving engagement with each of the variator balls 18 a, 18 b through one of a boundary layer type friction and an elastohydrodynamic film.

The second ring assembly is an annular member rotatably disposed in the housing. The second ring assembly is drivingly engaged with the output shaft 22. An output gear 58 formed in an outer surface of the second ring assembly is in driving engagement with a first end of the output shaft. A second variator ball engagement surface 52 is formed in a distal end of the second ring assembly. The second variator ball engagement surface 52 may be a conical surface or concave toroidal surface in contact with or slightly spaced apart from each of the variator balls 18 a, 18 b. The second variator ball engagement surface 52 is in driving engagement with each of the variator balls 18 a, 18 b through one of a boundary layer type friction and an elastohydrodynamic film.

The output shaft 22 has a first end drivingly engaged with second ring assembly through a first gear 40 formed in the output shaft 22 and a second end drivingly engaged with the vehicle output 6 through a second gear 62 formed in the output shaft 22. It is understood that the first gear 40 and the second gear 62 may have differing diameters to adjust a drive ratio between the second ring assembly and the vehicle output 6.

The variable transmission 2 c as shown in FIG. 3 may be operated in at least two different operating modes, depending on an engagement status of the first clutch 70, the second clutch 72, the first grounding clutch 64, and the second grounding clutch 30. The variable transmission 2 c may be operated in a continuously variable operating mode or an infinitely variable operating mode. The variable transmission 2 c may be operated in the continuously variable operating mode when the first clutch 70 is placed in the engaged position, the second clutch 72 is placed in a disengaged position, the first grounding clutch 64 is placed in the engaged position, and the second grounding clutch 30 is placed in a disengaged position. When placed in the continuously variable operating mode, the first ring assembly is drivingly engaged with the first ring assembly input shaft 82. Each of the variator balls 18 a, 18 b rotate about their axis to transfer torque from the first ring assembly to the second ring assembly, and to the vehicle output 6 through the output shaft 22. When the ball axle shafts are tilted within the variator carrier assembly, a drive ratio between the first ring assembly and the second ring assembly may be adjusted.

The variable transmission 2 c may be operated in the infinitely variable operating mode when the first clutch 70 is placed in a disengaged position, the second clutch 72 is placed in the engaged position, the first grounding clutch 64 is placed in a disengaged position, and the second grounding clutch 30 is placed in the engaged position. When placed in the infinitely variable operating mode, the variator carrier assembly is drivingly engaged with the first ring assembly input shaft 82 and the first ring assembly is fixed with respect to the housing. When the ball axle shafts are tilted within the variator carrier assembly, a drive ratio between the variator carrier assembly and the second ring assembly is adjusted to one of a forward operating mode, a powered neutral, and a reverse operating mode.

While the figures and description herein are directed to ball-type variators (CVTs), another embodiment may use version of a variator (CVT), such as a Variable-diameter pulley (VDP) or Reeves drive, a toroidal or roller-based CVT (Extroid CVT), a Magnetic CVT or mCVT, Ratcheting CVT, Hydrostatic CVTs, Naudic Incremental CVT (iCVT), Cone CVTs, Radial roller CVT, Planetary CVT, or any other version CVT. It is to be understood that the invention may assume various alternative orientations and step sequences, except where expressly specified to the contrary. It is also to be understood that the specific devices and processes illustrated in the attached drawings, and described in the specification herein are simply exemplary embodiments of the inventive concepts defined herein. Hence, specific dimensions, directions or other physical characteristics relating to the embodiments disclosed are not to be considered as limiting, unless expressly stated otherwise.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A variable transmission comprising:
   an input shaft;
   a first ring assembly rotatably disposed in a housing, the first ring assembly drivingly engaged with the input shaft using a plurality of double planet gears rotatably disposed on the first ring assembly, the first ring assembly configured to be prevented from rotating relative to the housing by a second grounding clutch, and the first ring assembly comprising a first variator ball engagement surface that is in driving engagement with a plurality of tiltable variator balls;
   a variator carrier assembly rotatably disposed in the housing and configured to be militated from rotating relative to the housing by a first grounding clutch, the variator carrier assembly comprising
      a drive shaft drivingly engaged using a second sun gear engaged with a second gear of each of the double planet gears, and
      an annular arrangement of the plurality of tiltable variator balls each having ball axle shafts; and
   a second ring assembly rotatably disposed in the housing drivingly engaged with a vehicle output, the second ring assembly comprising and a second variator ball engagement surface that is in driving engagement with each of the variator balls,
   wherein said transmission has an infinitely variable operating mode and a continuously variable operating mode.

2. The variable transmission of claim 1, wherein the input shaft is at least partially disposed in the housing.

3. The variable transmission of claim 1, wherein a first sun gear is formed on a second end of the input shaft and is drivingly engaged with a first gear of each of the double planet gears.

4. The variable transmission of claim 3, wherein the first sun gear, the plurality of double planet gears, and the drive shaft form a ringless planetary gearset.

5. The variable transmission of claim 1, wherein the first ring assembly driven by the plurality of double planet gears when the variator carrier assembly is fixed is driven when the input shaft is rotated.

6. The variable transmission of claim 1, wherein the variator carrier assembly driven by the plurality of double planet gears when the first ring assembly is fixed is driven when the input shaft is rotated.

7. The variable transmission of claim 1, wherein the variator carrier assembly comprises a first grounding clutch engagement portion that forms of the first grounding clutch.

8. The variable transmission of claim 7, wherein the first grounding clutch engagement portion extends outwardly from a second end of the variator carrier assembly.

9. The variable transmission of claim 1, wherein the first ring assembly is selectively drivingly engaged with the input shaft using the first grounding clutch.

10. The variable transmission of claim 1, wherein the first ring assembly comprises a second grounding clutch engagement portion.

11. The variable transmission of claim 10, wherein the second grounding clutch engagement portion extends outwardly from an outer surface of the first ring assembly.

12. The variable transmission of claim 1, wherein the second grounding clutch is at least partially disposed on an inner surface of the housing.

13. The variable transmission of claim 1, wherein the second grounding clutch is a plate clutch.

14. The variable transmission of claim 1, wherein the first variator carrier assembly may be selectively drivingly engaged with the input shaft using the second grounding clutch.

15. The variable transmission of claim 1, wherein the second ring assembly comprises an output gear formed in an outer surface of the second ring assembly.

16. The variable transmission of claim 15, wherein the output gear is in driving engagement with the vehicle output.

17. The variable transmission of claim 1, wherein an operating mode of the variable transmission is dependent on an engagement status of the first grounding clutch and the second grounding clutch.

18. The variable transmission of claim 1, wherein the continuously variable operating mode is achieved when the first grounding clutch is engaged and the second grounding clutch is disengaged.

19. The variable transmission of claim 1, wherein the infinitely variable operating mode is achieved when the first grounding clutch is disengaged and the second grounding clutch is engaged.

20. The variable transmission of claim 1, comprising a traction fluid.

* * * * *